(12) United States Patent
Tsai et al.

(10) Patent No.: US 10,545,013 B2
(45) Date of Patent: Jan. 28, 2020

(54) MEASURING TAPE ASSEMBLY

(71) Applicants: Chiung-Chang Tsai, Taichung (TW); Chung-Yu Tsai, Taichung (TW)

(72) Inventors: Chiung-Chang Tsai, Taichung (TW); Chung-Yu Tsai, Taichung (TW)

(*) Notice: Subject to any disclaimer, the term of this patent is extended or adjusted under 35 U.S.C. 154(b) by 228 days.

(21) Appl. No.: 15/866,477

(22) Filed: Jan. 10, 2018

(65) Prior Publication Data

US 2019/0212120 A1 Jul. 11, 2019

(51) Int. Cl.
*G01B 3/10* (2006.01)
*G01B 1/00* (2006.01)

(52) U.S. Cl.
CPC .......... *G01B 3/1056* (2013.01); *G01B 1/00* (2013.01); *G01B 2003/1097* (2013.01)

(58) Field of Classification Search
CPC .................................................. G01B 3/1056
USPC ........................................ 33/757, 758, 770
See application file for complete search history.

(56) References Cited

U.S. PATENT DOCUMENTS

| | | | | |
|---|---|---|---|---|
| RE14,947 E * | 9/1920 | Ballou | ............... | G01B 3/1071 33/758 |
| 3,494,569 A * | 2/1970 | Quenot | ............... | G01B 3/1005 242/405 |
| 5,077,911 A * | 1/1992 | von Wedemeyer | .. | G01B 3/1056 33/770 |
| 5,210,956 A * | 5/1993 | Knispel | ............... | G01B 3/1005 33/761 |
| 5,402,583 A * | 4/1995 | Komura | ............... | G01B 3/1056 33/758 |
| 2004/0064962 A1* | 4/2004 | Liu | ............... | G01B 3/1056 33/758 |
| 2010/0236086 A1* | 9/2010 | Huang | ............... | G01B 3/1056 33/770 |
| 2015/0047216 A1* | 2/2015 | Burch | ............... | G01B 3/1056 33/770 |
| 2017/0074632 A1* | 3/2017 | White, Jr. | ............ | G01B 3/1056 |
| 2017/0299364 A1* | 10/2017 | Carrier | ............... | G01B 3/1056 |
| 2018/0195847 A1* | 7/2018 | Khangar | ............... | G01B 1/00 |

* cited by examiner

*Primary Examiner* — George B Bennett

(57) ABSTRACT

A measuring tape assembly includes a tape retractably received in a case. The tape has an end hook connected to the first end thereof, and the end hook is located outside of the case. The end hook includes a first face and a second face which is located opposite to the first face. The first face includes multiple grooves which are straight grooves. The first face has first sand portion attached thereon so as to form a first friction face on the first face. The first face faces the case so as to contact an object. The second face has second sand portion attached thereon so as to form a second friction face on the second face. The first and second sand portions provide proper friction so that the end hook does not slip away from the object to be in contact with.

8 Claims, 6 Drawing Sheets

MEASURING TAPE ASSEMBLY

BACKGROUND OF THE INVENTION

1. Fields of the Invention

The present invention relates to a measuring tape assembly, and more particularly, to a measuring tape assembly with friction faces formed on two opposite sides of the end hook.

2. Descriptions of Related Art

The conventional measuring tape assembly is disclosed in FIG. 6 and comprises a tape 40 which is scrolled and accommodated in the case 42, and the tape 40 can be pulled out from one side of the case 42, or be retracted into the case 42. The tape 40 includes an end hook 41 which contacts against the side of the case 42 when the tape 40 is scrolled in the case 42. The end hook 41 can hook an object when measuring the distance from the object to the measuring tape assembly. However, the two opposite sides of the end hook 41 are smooth surface so that the end hook 41 may slip away from the object.

The present invention intends to provide a measuring tape assembly wherein two opposite sides of the end hook each have proper friction to eliminate the shortcomings mentioned above.

SUMMARY OF THE INVENTION

The present invention relates to a measuring tape assembly and comprises a tape retractably received in a case. The tape has an end hook connected to the first end thereof, and the end hook is located outside of the case. The end hook includes a first face and a second face which is located opposite to the first face. The first face includes multiple grooves which are straight grooves. The first face has first sand portion attached thereon so as to form a first friction face on the first face. The first face faces the case so as to contact an object. The second face has second sand portion attached thereon so as to form a second friction face on the second face. The first and second sand portions provide proper friction so that the end hook does not slip away from the object to be in contact with.

When the users pull the end hook, the users' hand does not slip off from the end hook.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
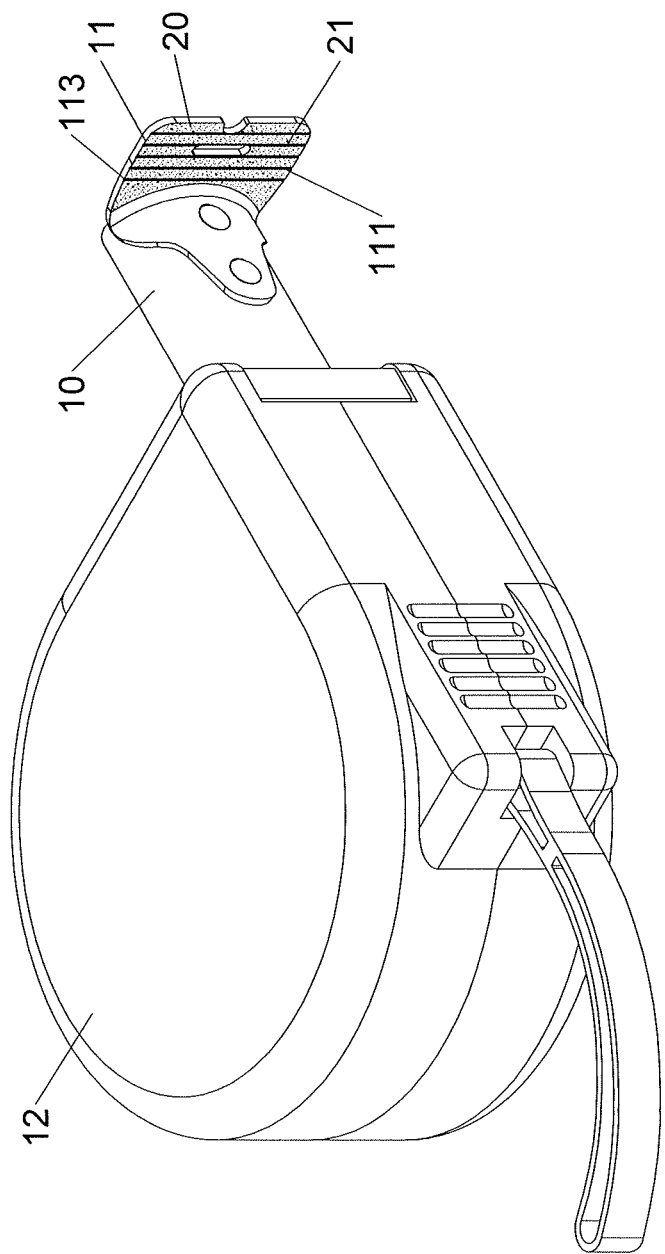
FIG. 1 is a perspective view to show the measuring tape assembly of the present invention.
Figure 2:
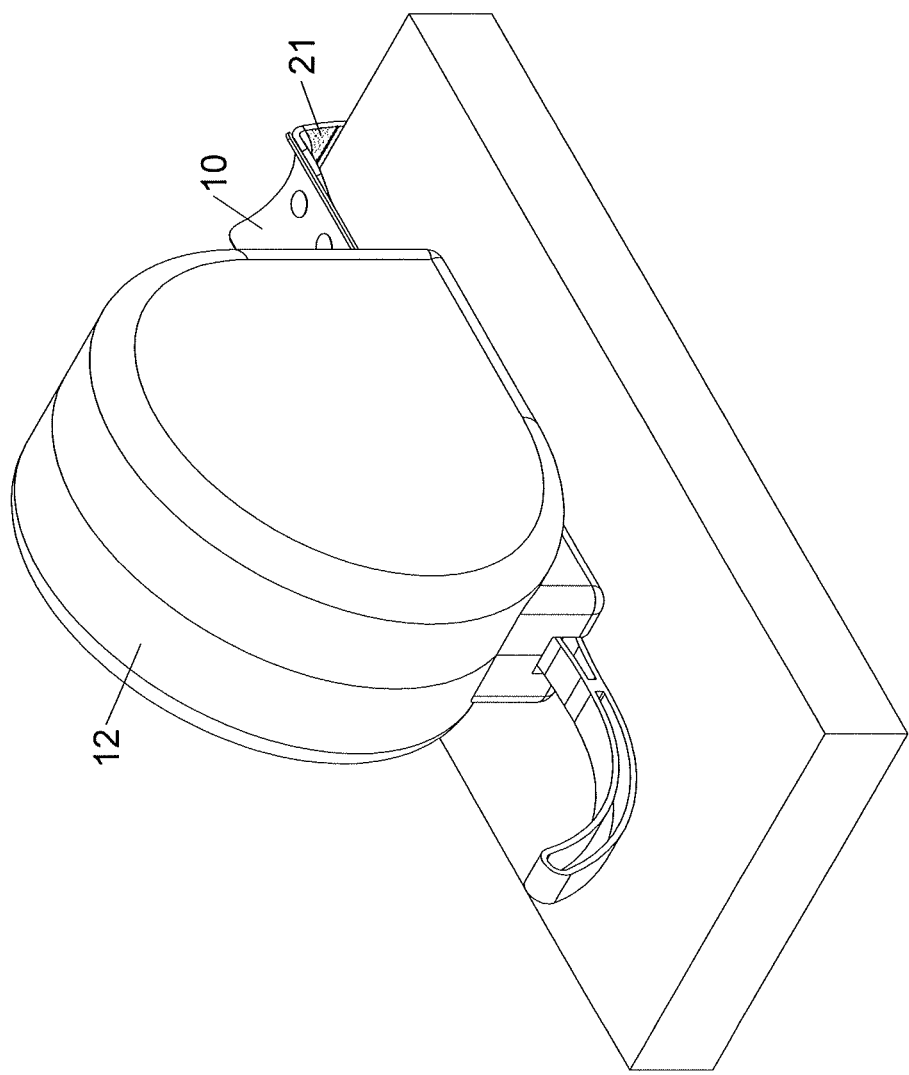
FIG. 2 shows that the end hook of the tape hooks on an object by the first friction face.
Figure 3:
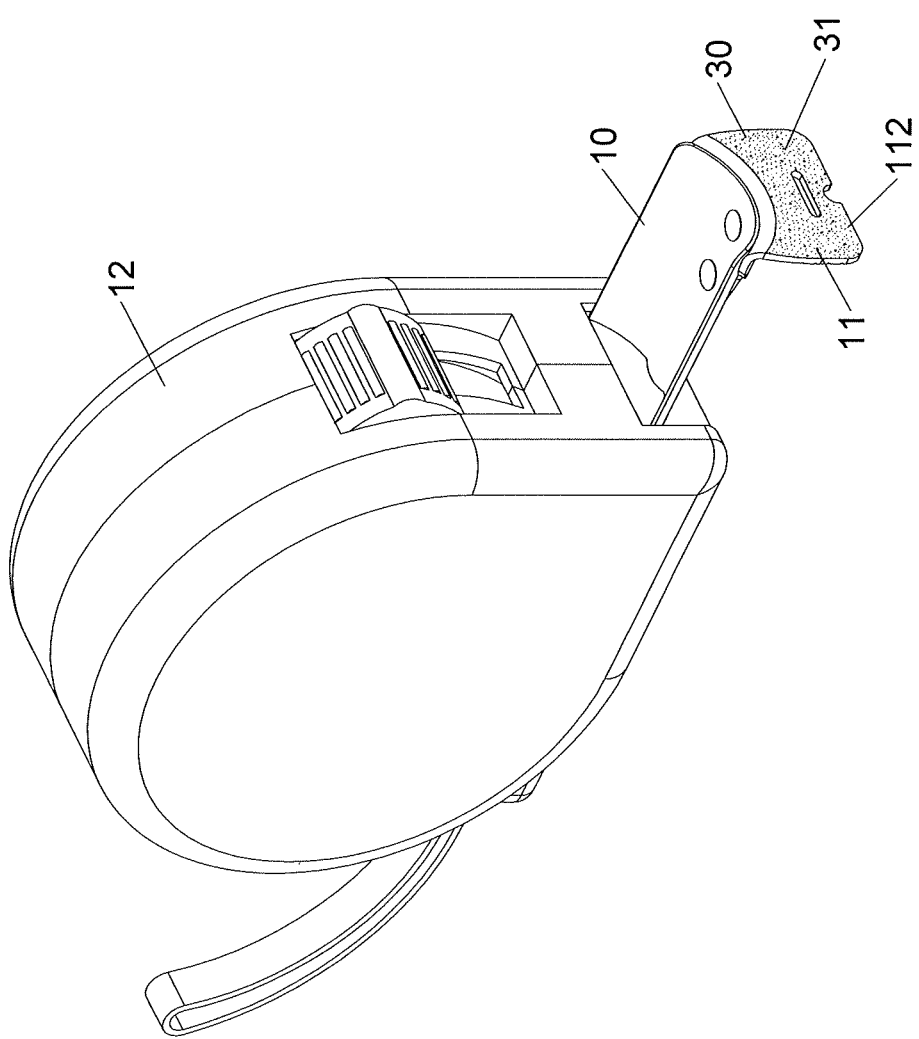
FIG. 3 shows the second friction on the second face of the end hook.

Referring to FIGS. 1 to 3, the measuring tape assembly of the present invention comprises a tape 10 and a case 12. The tape 10 is retractably received in a case 12. The tape 10 is a flexible tape and can be made by any known material such as fabric or leather. The tape 10 has an end hook 11 connected to one end thereof, and the end hook 11 is located outside of the case 12. The end hook 11 includes a first face 111 and a second face 112 which is located opposite to the first face 111. The first face 111 has multiple grooves 113 defined therein, and the grooves 113 are straight grooves 113. The first face 111 of the end hook 11 faces the case 12. The tape 10 can be pulled from the case 12 or be retracted into the case 12.

The first face 111 has a first sand portion 20 attached thereon so as to form a first friction face 21 on the first face 111. The average surface roughness of the first friction face 21 is bigger than the average surface roughness of the tape 10. The first face 111 is used to contact an object as shown in FIG. 2 when measuring a length or distance from that end hook 11 to the case 12. The first sand portion 20 comprises tiny particles which include grinding particles and adhesive. The grinding particles and the adhesive are combined to be the first sand portion 20. The grinding particles and the adhesive can be combined by way of sintering. The density of the particles of the first sand portion 20 of the first friction face 21 is at least 25% $g/cm^3$. The average diameter of the particles is 8.4~1000.00 μm. The particles used for the first sand portion 20 can be cataloged into regular grinding particles and ultra-hard grinding particles. The regular particles are corundum and silicon carbide. The ultra-hard grinding particles are diamond, cubic boron nitride. The adhesive can be used on ceramic sand wheels, resin sand wheels, rubber sand wheels and metal sand wheels. The shapes of the first sand portion 20 are flat shape, tubular shape, cup-like shape and disk shape.

The second face 112 has second sand portion 30 attached thereon so as to form a second friction face 31 on the second face 112. The average surface roughness of the second friction face 31 is bigger than the average surface roughness of the tape 10. The first and second sand portions 20, 30 are attached onto the first face 111 and the second face 112 by way of electro-plating. It is noted that the first sand portion 20 on the first face 111 and the second sand portion 30 on the second face 112 are different in terms of the size of the grinding particles, the adhesive, the shape, and the machining method. Wherein the average roughness of the first friction face 21 and the average roughness of the second friction face 31 are different so as to grind an object to have different degree of roughness respectively. Wherein the average roughness of the first friction face 21 and the average roughness of the second friction face 31 are the same so as to be manufactured easily.

Figure 4:
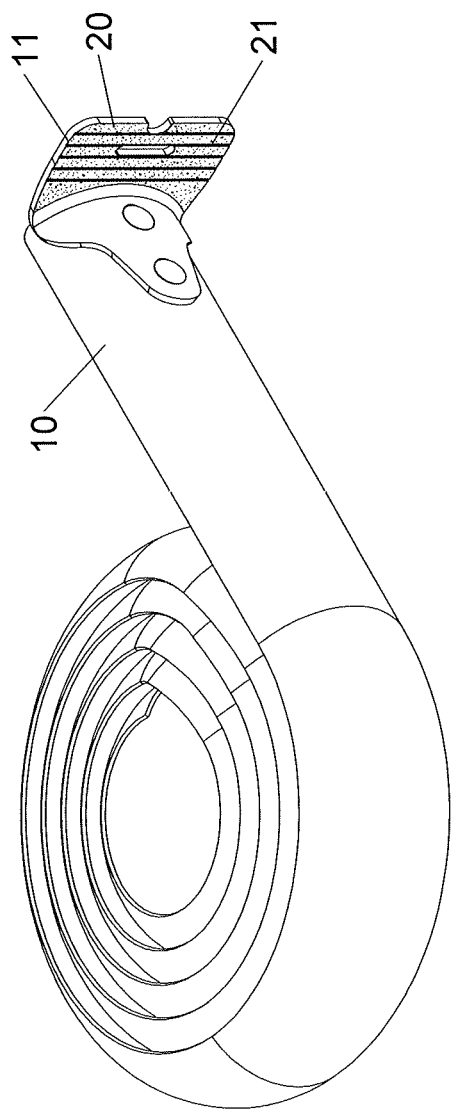
FIG. 4 shows another embodiment of the measuring tape assembly of the present invention.
Figure 5:
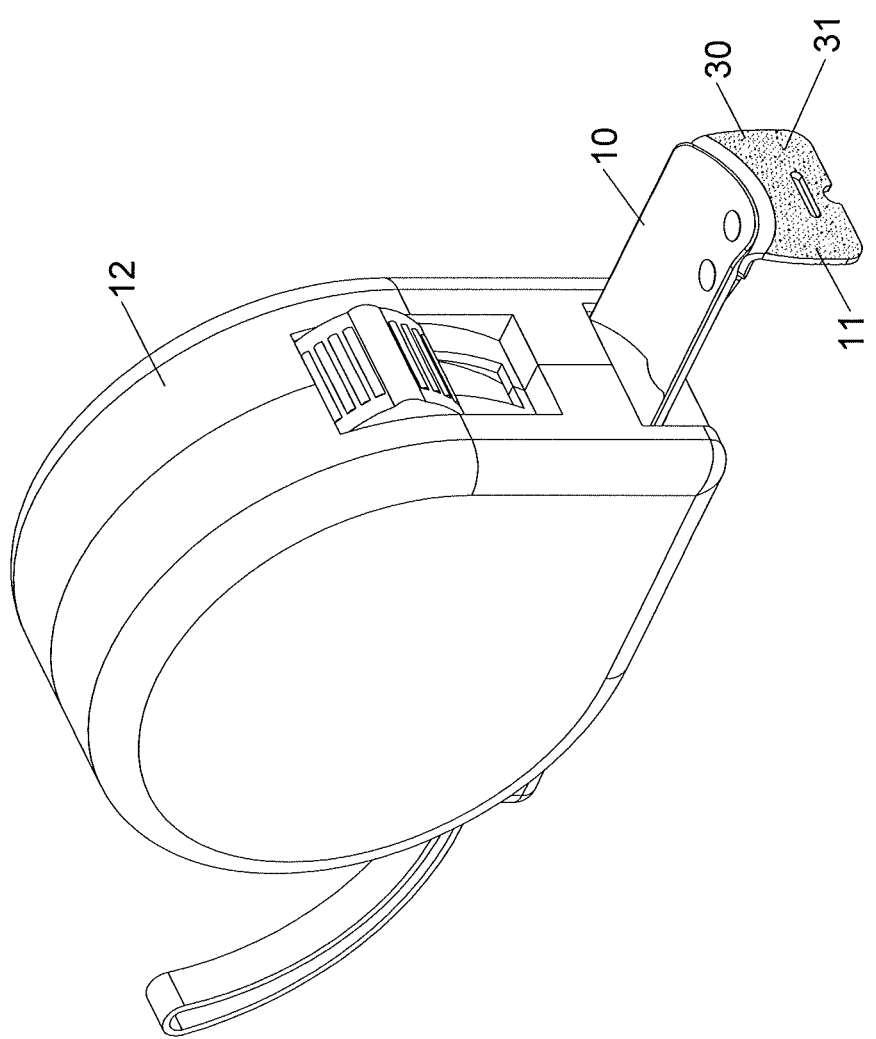
FIG. 5 shows that the first and second sand portion on the first and second faces of the end hook are the same.
Figure 6:
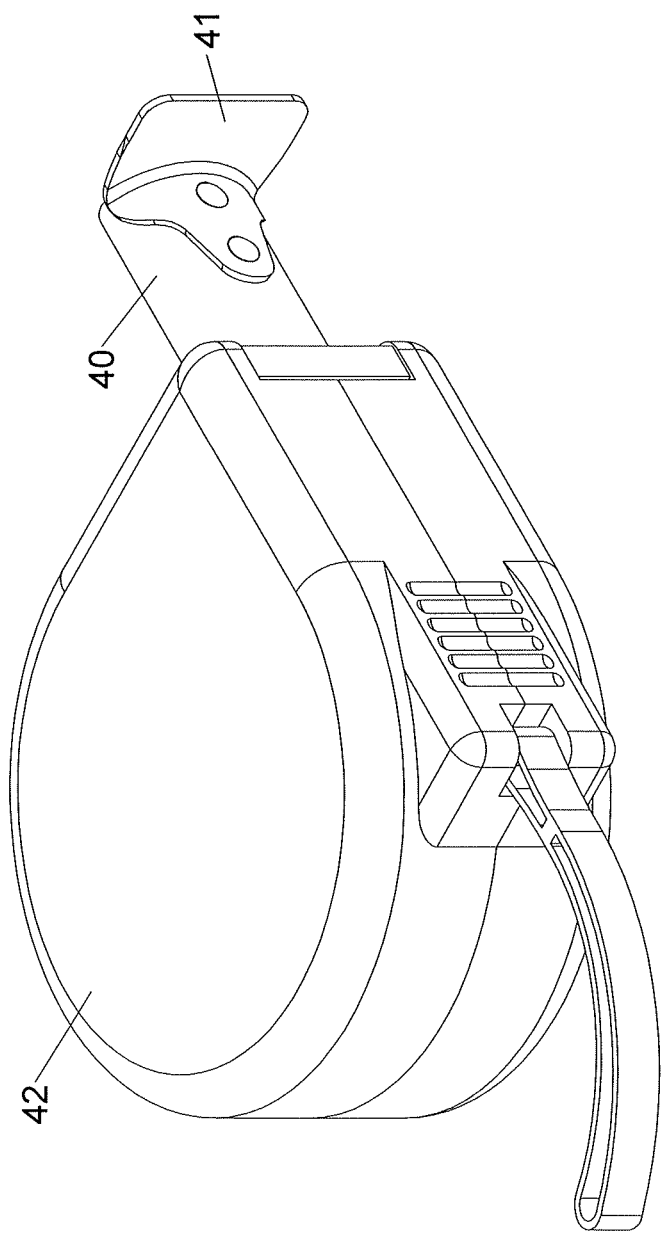
FIG. 6 shows a conventional measuring tape assembly.

FIG. 4 shows that the tape 10 is not received in the case 12 and is made by fabric or leather. The tape 10 can be used without the case 12. FIG. 5 shows that the first sand portion 20 on the first face 111 and the second sand portion 30 on the second face 112 are the same.

The advantages of the present invention are that when the first face 111 contacts an object as shown in FIG. 2, the first friction face 21 provides proper friction so that the end hook 11 does not slip away from the object.

When the users pulls the tape 10 by pulling the end hook 11, the first and second friction faces 21, 31 prevent the end hook 11 from separating from the users' hand.

When there is oil or grease attached to the end hook 11, the first and second friction faces 21, 31 on the end hook 11 provide friction to avoid the end hook 11 from slipping away.

The first sand portion 20 can be colored so as to have better identification to the users.

The grooves 113 defined in the first face 111 also provide extra friction.

While we have shown and described the embodiment in accordance with the present invention, it should be clear to those skilled in the art that further embodiments may be made without departing from the scope of the present invention.

What is claimed is:

1. A measuring tape assembly comprising:
    a tape having an end hook connected to one end thereof, the end hook having a first face and a second face which is located opposite to the first face, the first face having multiple grooves which are straight grooves;
    the tape retractably received in a case and the end hook located outside of the case, the tape being pulled from the case or being retracted into the case;
    the first face having a first sand portion attached thereon so as to form a first friction face on the first face, the first face facing the case and adapted to contact an object, an average surface roughness of the first friction face being bigger than an average surface roughness of the tape, and
    the second face having a second sand portion attached thereon so as to form a second friction face on the second face, an average surface roughness of the first friction face being bigger than an average surface roughness of the tape.

2. The measuring tape assembly as claimed in claim 1, wherein the first and second sand portions being attached onto the first face and the second face by way of electroplating respectively.

3. The measuring tape assembly as claimed in claim 1, wherein the first sand portion is made by a method for making sand wheels to attach multiple grinding particles onto the first face.

4. The measuring tape assembly as claimed in claim 3, wherein a density of the particles of the first sand portion of the first friction face is at least 25% g/cm$^3$.

5. The measuring tape assembly as claimed in claim 4, wherein the average diameter of the multiple grinding particles is 8.4~1000.00 μm.

6. The measuring tape assembly as claimed in claim 1, wherein the tape is a flexible tape.

7. The measuring tape assembly as claimed in claim 1, wherein the average roughness of the first friction face and the average roughness of the second friction face are the same.

8. The measuring tape assembly as claimed in claim 1, wherein the average roughness of the first friction face and the average roughness of the second friction face are different.

* * * * *